United States Patent
Solano Arenas et al.

(10) Patent No.: US 12,192,858 B2
(45) Date of Patent: Jan. 7, 2025

(54) MBMS SUPPORT ON IOPS

(71) Applicant: Telefonaktiebolaget LM Ericsson (publ), Stockholm (SE)

(72) Inventors: John Camilo Solano Arenas, Neuss (DE); Joakim Åkesson, Landvetter (SE); Salvador Hinarejos Fernandez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/637,103

(22) PCT Filed: Aug. 6, 2020

(86) PCT No.: PCT/EP2020/072136
§ 371 (c)(1),
(2) Date: Feb. 22, 2022

(87) PCT Pub. No.: WO2021/037518
PCT Pub. Date: Mar. 4, 2021

(65) Prior Publication Data
US 2022/0303733 A1    Sep. 22, 2022

Related U.S. Application Data

(60) Provisional application No. 62/891,453, filed on Aug. 26, 2019.

(51) Int. Cl.
*H04W 4/08* (2009.01)
*H04W 48/16* (2009.01)

(52) U.S. Cl.
CPC ............. *H04W 4/08* (2013.01); *H04W 48/16* (2013.01)

(58) Field of Classification Search
CPC ............................... H04W 4/08; H04W 48/16
USPC ................................. 370/329, 400, 401, 405
See application file for complete search history.

(56) References Cited

U.S. PATENT DOCUMENTS 11,757,516 B2 * 9/2023 Horn .................... H04B 17/318
375/267

FOREIGN PATENT DOCUMENTS

| WO | 2020164859 A1 | 8/2020 |
| WO | 2020260435 A1 | 12/2020 |

OTHER PUBLICATIONS

Author Unknown, "Technical Specification Group Services and System Aspects; Functional architecture and information flows to support Mission Critical Video (MCVideo); Stage 2 (Release 16)," Technical Specification 23.281, Version 16.3.0, Sep. 2019, 3GPP Organizational Partners, 183 pages.

(Continued)

*Primary Examiner* — Dang T Ton
(74) *Attorney, Agent, or Firm* — Withrow & Terranova, PLLC

(57) ABSTRACT

Disclosed herein is a method performed by an IOPS application function, AF, to provide a group communication service. The method comprises: establishing an IOPS MBMS bearer, the IOPS MBMS bearer being an MBMS bearer within a MBSFN area served by one or more radio access nodes that are operating in an IOPS mode of operation; discovering one or more UEs via an IOPS discovery procedure; sending to the one or more UEs, an MBMS bearer announcement for the IOPS MBMS bearer.

20 Claims, 8 Drawing Sheets

Group communication support on the IOPS mode of operation based on always MBMS-based transmissions

(56) References Cited

OTHER PUBLICATIONS

Author Unknown, "Technical Specification Group Core Network and Terminals; Mission Critical Push to Talk (MCPTT) call control; Protocol specification (Release 16)," Technical Specification 24.379, Version 16.2.0, Sep. 2019, 3GPP Organizational Partners, 579 pages.
Alcatel-Lucent, et al., "S2-150351: IOPS alternatives," 3GPP SA WG2 Meeting #107, Jan. 26-30, 2015, Sorrento, Italy, 10 pages.
Ericsson, "S6-191086: Pseudo-CR on Update to solution 4," 3GPP TSG-SA WG6 Meeting #31, May 20-24, 2019, Bruges, Belgium, 9 pages.
Notice of Reasons for Rejection for Japanese Patent Application No. 2022-511249, mailed Apr. 25, 2023, 6 pages.
Author Unkown, "Technical Specification Group Services and System Aspects; Network architecture (Release 15)," Technical Specification 23.002, Version 15.0.0, Mar. 2018, 3GPP Organizational Partners, 115 pages.
Author Unknown, "Technical Specification Group Services and System Aspects; Policy and charging control architecture (Release 15)," Technical Specification 23.203, Version 15.0.0, Sep. 2017, 3GPP Organizational Partners, 257 pages.
Author Unknown, "Technical Specification Group Services and System Aspects; Policy and charging control architecture (Release 16)," Technical Specification 23.203, Version 16.0.0, Mar. 2019, 3GPP Organizational Partners, 263 pages.
Author Unknown, "Technical Specification Group Services and System Aspects; Common functional architecture to support mission critical services; Stage 2 (Release 16)," Technical Specification 23.280, Version 16.3.0, Jun. 2019, 3GPP Organizational Partners, 221 pages.
Author Unknown, "Technical Specification Group Services and System Aspects; Functional architecture and information flows to support Mission Critical Video (MCVideo); Stage 2 (Release 16)," Technical Specification 23.281, Version 16.2.0, Jun. 2019, 3GPP Organizational Partners, 183 pages.
Author Unknown, "Technical Specification Group Services and System Aspects; Functional architecture and information flows to support Mission Critical Data (MCData); Stage 2 (Release 16)," Technical Specification 23.282, Version 16.3.0, Jun. 2019, 3GPP Organizational Partners, 161 pages.
Author Unknown, "Technical Specification Group Services and System Aspects; Proximity-based services (ProSe); Stage 2 (Release 15)," Technical Specification 23.303, Version 15.1.0, Jun. 2018, 3GPP Organizational Partners, 130 pages.
Author Unknown, "Technical Specification Group Services and System Aspects; Functional architecture and information flows to support Mission Critical Push to Talk (MCPTT); Stage 2 (Release 16)," Technical Specification 23.379, Version 16.2.0, Mar. 2019, 3GPP Organizational Partners, 219 pages.
Author Unknown, "Technical Specification Group Services and System Aspects; Functional architecture and information flows to support Mission Critical Push to Talk (MCPTT); Stage 2 (Release 16)," Technical Specification 23.379, Version 16.3.0, Jun. 2019, 3GPP Organizational Partners, 242 pages.
Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.3.0, Jun. 2019, 3GPP Organizational Partners, 423 pages.
Author Unknown, "Technical Specification Group Services and System Aspects; Group Communication System Enablers for LTE (GCSE_LTE); Stage 2 (Release 15)," Technical Specification 23.468, Version 15.0.0, Dec. 2017, 3GPP Organizational Partners, 32 pages.
Author Unknown, "Technical Specification Group Services and System Aspects; Study on MC services access aspects (Release 16)," Technical Report 23.778, Version 1.2.0, Mar. 2019, 3GPP Organizational Partners, 25 pages.
Author Unknown, "Technical Specification Group Services and System Aspects; Study on Mission Critical services access aspects (Release 16)," Technical Report 23.778, Version 16.0.0, Jun. 2019, 3GPP Organizational Partners, 36 pages.
Author Unknown, "Technical Specification Group Core Network and Terminals; Mission Critical Push to Talk (MCPTT) call control; Protocol specification (Release 16)," Technical Specification 24.379, Version 16.1.0, Jun. 2019, 3GPP Organizational Partners, 404 pages.
Author Unknown, "Technical Specification Group Core Network and Terminals Mission Critical Push to Talk (MCPTT) media plane control; Protocol specification (Release 16)," Technical Specification 24.380, Version 16.2.0, Jun. 2019, 3GPP Organizational Partners, 272 pages.
Author Unknown, "Technical Specification Group Core Network and Terminals; Diameter Data Management Applications (Release 15)," Technical Specification 29.283, Version 15.0.0, Jun. 2018, 3GPP Organizational Partners, 39 pages.
Author Unknown, "Technical Specification Group Core Network and Terminals; Group Communication System Enablers for LTE (GCSE_LTE); MB2 Reference Point; Stage 3 (Release 15)," Technical Specification 29.468, Version 15.6.0, Jun. 2019, 3GPP Organizational Partners, 44 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.4.0, Dec. 2018, 3GPP Organizational Partners, 363 pages.
Ericsson, "S6-190507: Pseudo-CR on IOPS discovery procedure for Solution 4," 3GPP TSG-SA WG6 Meeting #29, Feb. 25-Mar. 1, 2019, Montreal, Canada, 4 pages.
Ericsson, "S6-191759: Discussion on the MC services support on the IOPS mode of operation," 3GPP TSG-SA WG6 Meeting #33, Sep. 2-6, 2019, Sophia Antipolis, France, 6 pages.
Examination Report for European Patent Application No. 20754701.9, mailed Feb. 3, 2022, 6 pages.
International Search Report and Written Opinion for International Patent Application No. PCT/EP2020/072136, mailed Dec. 15, 2020, 10 pages.

\* cited by examiner

*IOPS system high level representation*

IOPS MBMS configuration to support MC service group communications based on always MBMS-based transmission Group communication support on the IOPS mode of operation based on always MBMS-based transmissions Group communication support on the IOPS mode of operation based on always MBMS-based transmissions

MBMS SUPPORT ON IOPS

This application is a 35 U.S.C. § 371 national phase filing of International Application No. PCT/EP2020/072136, filed Aug. 6, 2020, which claims the benefit of provisional patent application Ser. No. 62/891,453, filed Aug. 26, 2019, the disclosures of which are incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Mission Critical (MC) communication services are essential for the work performed by public safety users e.g. police and fire brigade. The MC communications service requires preferential handling compared to normal telecommunication services, including handling of prioritized MC calls for emergency and imminent threats. Furthermore, the MC communication service requires several resilience features that provide a guaranteed service level even if part of the network or backhaul infrastructure fails.

The most commonly used communication method for public safety users is Group Communication (GC), which requires that the same information is delivered to multiple users. One type of Group Communication is the Push to Talk (PTT) service. A GC system can be designed with a centralized architecture approach in which a centralized GC control node provides full control of all group data (e.g. group membership, policies, user authorities, and prioritizations). Such an approach requires a network infrastructure that provides high network availability. This type of operation is sometimes known as Trunked Mode Operation (TMO) or on-network operation.

Third Generation Partnership Project (3GPP) based networks supporting GC services or MC services like Mission Critical Push To Talk (MCPTT) are specified in 3GPP TS 23.280 v16.3.0 and 3GPP TS 23.379 v16.3.0. Other MC services include Mission Critical Video (MCVideo), which is specified in 3GPP TS 23.281 v16.3.0, and Mission Critical Data (MCData), which is specified in 3GPP TS 23.282 v16.3.0.

Each MC service supports several types of communications amongst the users (e.g. group call, private call). There are several common functions and entities (e.g. group, configuration, identity) which are used by the MC services. The common functional architecture, described in 3GPP TS 23.280 v16.3.0, to support MC services comprises a central MC service server connected to the network providing full control of the MC service data, and MC service client(s) operating on a user-equipments (UEs) providing MC service communications support. The MC service UE primarily obtains access to a MC service via E-UTRAN, using the evolved packet system (EPS) architecture defined in 3GPP TS 23.401 v16.3.0.

Furthermore, MC services can be provided by utilizing different transmission modes. One important aspect in MC services is that the same information is delivered to multiple users. These users may be located at different locations. If many users are located within the same area, multicast-broadcast based transmissions using e.g. Multicast-Broadcast Multimedia Services (MBMS) is more efficient. In LTE, broadcast transmissions across multiple cells are defined as evolved MBMS (eMBMS). MBMS can be used in a transmission mode known as multicast-broadcast single-frequency network (MBSFN). In MBSFN transmissions, MBMS bearers are established and associated to a temporary mobile group identity (TMGI). Hence, there are several radio cells that transmit the same signal synchronously on the same frequency in time and phase. This provides an improved Signal Interference and Noise Ratio (SINR) due to multiple transmissions added to a combined signal power and also considerable interference reductions for the wireless device.

Within the context of a 3GPP-based LTE network, the UEs get access to the radio access network (RAN) via radio base stations (i.e. eNBs). The eNBs are connected to an evolved packet core network (EPC) supporting MBMS for the downlink traffic. A MC service server is connected to the EPC. The RAN is then assumed to be configured with a set of pre-defined MBSFN areas. Hence, several eNBs are configured to be part of a same MBSFN area with a certain downlink capacity. There are also cases in which an eNB does not belong to an MBSFN area or a UE is located outside an MBSFN area. For those cases, the MC service is provided by normal unicast transmission mode. It is then highly desirable to provide service continuity to the UEs.

The currently available solution for MC service continuity based on multicast and unicast transmissions is standardized in 3GPP TS 23.280 v16.3.0, TS 23.468 V15.0.0. The standardized service continuity method relies on the methodology to transfer the group communication from multicast to unicast, from unicast to multicast, and from multicast to multicast. The transfer decision is based on a MBMS listening status report (defined in 3GPP TS 23.280), where a UE reports to the MC service server the transfer quality of the MBMS bearer. For instance, a UE moving from one MBSFN Area with no sufficient MBMS bearer quality will need to transfer the communication from multicast (e.g. in MBSFN Area 1) to unicast, or to another multicast (for example to another MBSFN Area, e.g. MBSFN Area 2) where the MC service is also being broadcasted on a sufficient MBMS bearer quality. If a UE is receiving data in unicast and moves into a MBSFN area, a communication transfer from unicast to multicast may then be performed.

Also, if a MC service UE is going out of the network coverage, it can attempt to switch to the off-network mode of operation to make use of proximity services (ProSe) as specified in 3GPP TS 23.303 v15.1.0. ProSe provides support to the off-network operation based on a direct communication with another UE without direct support from the network. In this case, the MC service clients operating on the UEs are controlling and providing the MC service communication. For that, all the configuration data (which is similar to but normally a subset of the configuration data for an on-network operation) must be pre-provisioned to each UE.

In a 3GPP based network that provides MC services, the service can be guaranteed even in the case of backhaul failure by using the feature known as Isolated E-UTRAN Operations for Public Safety (IOPS) described in 3GPP TS 23.401 v16.3.0 Annex K. The IOPS functionality provides local connectivity to the public safety users' devices that are within the communication range of E-UTRAN radio base station(s) (eNB) that supports IOPS, i.e. one or more IOPS-capable eNBs. The IOPS-capable eNB(s) is co-sited with a local Evolved Packet Core (EPC) which is used during the IOPS mode of operation. The local EPC may include the following functional entities: Mobility Management Entity (MME), Serving Gateway (S-GW), Packet Data Network Gateway (P-GW) and Home Subscriber Server (HSS).

The IOPS EPS system, i.e. the IOPS-capable eNB(s) and the local EPC, can be used in different types of deployments. One common scenario is when radio base station is located on a remote location (e.g. an island) and the radio base station is connected to the macro core network via e.g. a microwave link. If there is a microwave link failure, it is critical for Public Safety users to be able to at least have local connectivity for the communication between the users in the coverage of the IOPS-capable eNBs.

When the IOPS mode of operation is initiated, e.g. due to a backhaul link failure, the public safety/MC users should be able to begin being served by the IOPS EPS network. During the IOPS mode of operation, the MC services can be supported based on an off-network like operation, where the MC services are directly provided by the MC users, but the corresponding MC service IP packets are transmitted over the IOPS EPS network to an IOPS MC system. The IOPS MC system, which is co-located with the IOPS EPS, distributes those IP packets to the targeted user(s) over the IOPS EPS network.

As described in U.S. Provisional Patent Application No. 62/868,241, filed Jun. 28, 2019, entitled IOPS FUNCTIONAL MODEL FOR MISSION CRITICAL SERVICES, the IOPS MC system can be represented by a functional model which consists of two IOPS application functions (IOPS AFs): an IOPS distribution function and an IOPS connectivity function. On the other hand, the UE includes an MC service client and an IOPS connectivity client to support MC services on the IOPS mode of operation.

FIG. 1

A general IOPS system is depicted in FIG. 1.

The IOPS AF, via the IOPS connectivity function, enables MC users operating on the UEs to be registered and discovered on the IOPS mode of operation. The IOPS AF, via the IOPS distribution function, provides IP connectivity for the MC service communication among the MC users. This means that the IOPS AF distributes IP packets received from an MC user targeting one or more MC users. For the case of IP packets related to group communications, e.g. IP packets targeting multiple users in a group call, the IOPS AF can distribute them to the targeted users over unicast and/or multicast transmissions over the IOPS EPS network.

Considering that the IOPS mode of operation is an off-network like operation, for the case of a one to one communication, e.g. a private call between two users, the IP packets received by the IOPS distribution function have, as final destination IP address, the unicast IP address of the targeted user. For the case of a group communication, e.g. a group call, the IP packets received by the IOPS distribution function have, as final destination IP address, the multicast IP address of the targeted group.

As described in U.S. Provisional Patent Application No. 62/804,972, filed Feb. 13, 2019, entitled DISCOVERY PROCEDURE BASED ON A MINIMAL SERVER IMPLEMENTATION FOR MISSION CRITICAL SERVICES OVER ISOLATED E-UTRAN OPERATIONS FOR PUBLIC SAFETY (IOPS) (attached as Appendix B) and U.S. Provisional Patent Application No. 62/827,237, filed Apr. 1, 2019, entitled IOPS-BASED COMMUNICATION BASED ON A PACKET DISTRIBUTION FUNCTION FOR MISSION CRITICAL SERVICES (attached as Appendix C), some methods have been proposed for supporting the discovery of users and IP connectivity on the IOPS mode of operation.

SUMMARY

There currently exist certain challenge(s). The support of MC services over IOPS systems needs to be specified in 3GPP Release 17. This includes the definition and specification of how MBMS transmissions are supported for group communications on the IOPS mode of operation.

Certain aspects of the present disclosure and their embodiments may provide solutions to the aforementioned or other challenges. Systems and methods for supporting MBMS transmissions for MC group communications on the IOPS mode of operation are provided, where the MC services are directly provided by the MC users and transmitted over an lops MC system and an IOPS EPS network.

Embodiments of the present disclosure provide support for MC service group communications on the IOPS mode of operation based on MBMS transmissions.

Certain embodiments may provide one or more of the following technical advantage(s). The advantages of embodiments of the present disclosure include supporting MC services based on MBMS transmissions for group communications on the IOPS mode of operation.

BRIEF DESCRIPTION OF THE DRAWINGS

The accompanying drawings, which are incorporated herein and form part of the specification, illustrate various embodiments.

DETAILED DESCRIPTION

Figure 1:
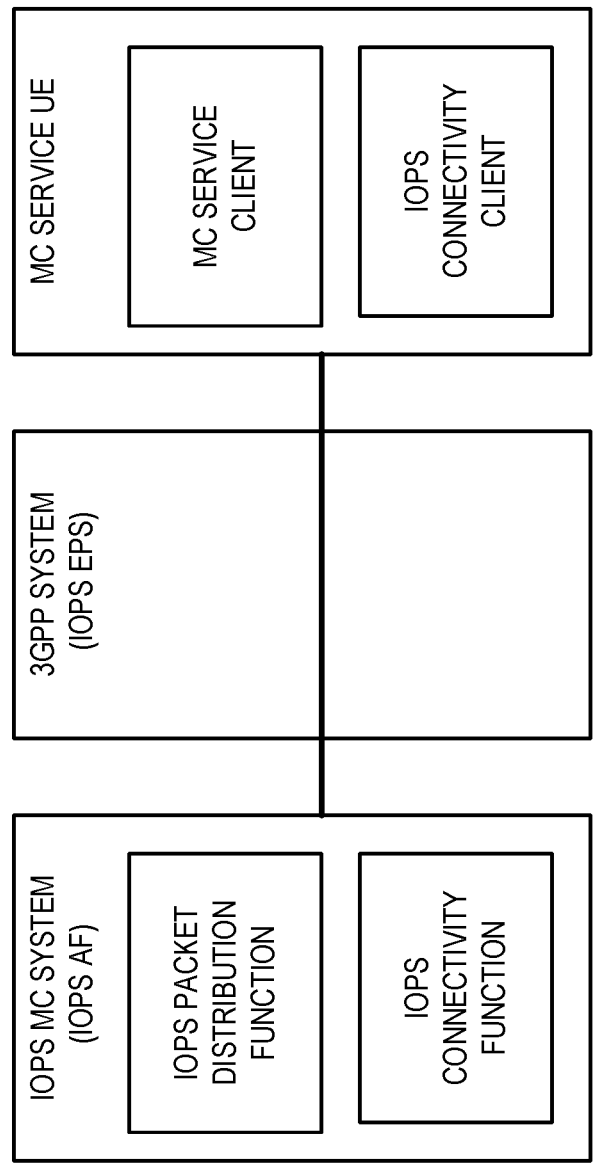
FIG. 1 depicts a general IOPS system.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in Appendix D.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments of the present disclosure are is described within the context of a 3GPP-based LTE network, i.e. an EPS including E-UTRAN and EPC. However, the problems and solutions described herein are equally applicable to wireless access networks and user-equipment (UE) implementing other access technologies and standards (e.g. a 5G system including 5G core and 5G radio access). LTE is used as an example technology where the embodiments described herein are suitable for LTE and using LTE in the description therefore is particularly useful for understanding the problem and solutions solving the problem. Furthermore, embodiments of the present disclosure focus on the IOPS mode of operation; however, the problems and solutions described herein are also equally applicable to other scenarios, e.g. for the case of implementing a private network, a.k.a. non-public networks (NPN), with a local EPC or 5GC to provide application services to authorized users within the private network coverage area.

Systems and methods for supporting MBMS transmissions for MC group communications on the IOPS mode of operation are provided, where the MC services are directly provided by the MC users and transmitted over an IOPS MC system and an IOPS EPS network.

FIG. 2

Figure 2:
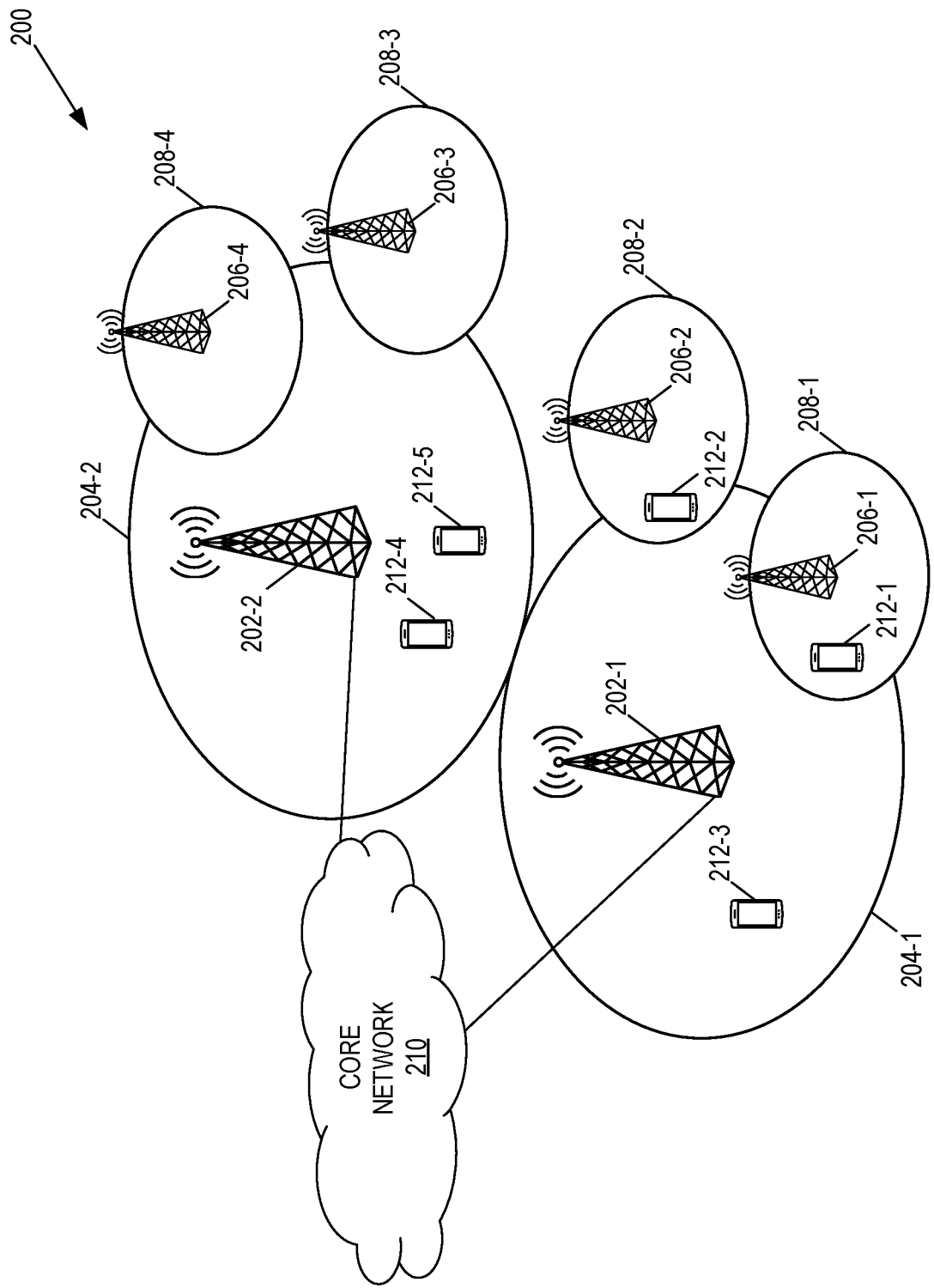
FIG. 2 illustrates one example of a cellular communications system 200 in which embodiments of the present disclosure may be implemented.

In this regard, FIG. 2 illustrates one example of a cellular communications system 200 in which embodiments of the present disclosure may be implemented. In the embodiments described herein, the cellular communications system 200 is an Evolved Packet System (EPS) including a LTE RAN; however, the present disclosure is not limited thereto. The embodiments disclosed herein are equally applicable to other technologies such as, e.g., 5G. In this example, the RAN includes base stations 202-1 and 202-2, which in LTE are referred to as eNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Now, a description of some example embodiments of the present disclosure will be provided. Throughout the present disclosure, it is assumed that the public safety users, also refer here as MC service UEs or MC users or just UEs or users, have been provided with the configuration needed to utilize any MC service. Such a configuration, to be defined here as the MC service user configuration profile, is assumed to be stored at the UEs (e.g., stored by MC service clients operating on the UEs). For each UE, the MC service user configuration profile may comprise information (e.g., static data) needed for the configuration of the MC service (e.g., MCPTT service) that is supported by the UE in question. For each UE, the MC service user configuration profile may contain information about at least one of: the current UE configuration, MC service user profile configuration, group configuration (e.g., group ID), and service configuration data or similar which is stored at the UE for off-network operation (e.g., specific parameters are described in 3GPP TS 23.280 V16.3.0 Annex A and 3GPP TS 23.379 V16.2.0 Annex A for the MC services and MCPTT service UE/off-network, respectively). The MC service user configuration profile can be provisioned by either offline procedures or after the UEs have been authenticated and registered with the central MC system.

The user configuration profile can also include specific configuration to be utilized on the IOPS mode of operation. It can include specific IOPS group configuration, e.g. group IP multicast addresses associated to the IOPS group(s) a user belongs to. For the IOPS group configuration, the same off-network group configuration could be also utilized.

In the case there is a link failure between the radio access network (eNBs) and the macro core network (EPC), it is assumed that the IOPS mode of operation is initiated, i.e. an off-network like operation, where the MC services are directly provided by the MC users, but the corresponding MC service IP packets are transmitted over the IOPS MC system. For that, authorized UEs have been configured to support the IOPS mode of operation.

When the IOPS mode of operation is initiated, an IOPS EPS network (i.e. IOPS-capable eNB(s) connected to a local EPC) provides local connectivity to UEs which are in the coverage area of this IOPS EPS network. For support of MC services in the IOPS mode of operation, the IOPS MC system, i.e. the IOPS AF, enables MC users to be registered and discovered. Also, the IOPS AF provides supporting IP connectivity among the users, i.e. the IOPS AF distributes IP packets received from an MC user targeting one or more MC users.

Throughout the present disclosure, the support of group communications on the IOPS mode of operation is addressed based on multicast, i.e. MBMS-based, transmissions. For that, it is assumed that the Iaps AF supports functionalities of a group communication service application server (GCS AS) to establish MBMS bearers and distribute IP packets via multicast-broadcast transmissions. Also, it is assumed that the local EPC supports MBMS.

MC Service Group Communication Support on the IOPS Mode of Operation Based on Always MBMS-Based Transmissions In one embodiment, in the IOPS mode of operation, the eNB(s) within the IOPS system are configured to be part of the same MBSFN area, i.e. one IOPS system consists of only one MBSFN area. This MBSFN area is referred to herein as the IOPS MBSFN area.

When the IOPS mode of operation is initiated, the IOPS AF pre-establishes an MBMS bearer within the IOPS MBSFN area. This MBMS bearer is referred to herein as the IOPS MBMS bearer or IOPS TMGI. This means that the establishment of the IOPS MBMS bearer may already occur before the IOPS AF discovers any user(s) in the IOPS mode of operation. Hence, the IOPS AF efficiently establishes an MBMS bearer before the initiation of any group communication session during the IOPS mode of operation.

For the IOPS MBMS bearer establishment, the IOPS AF sends an MBMS bearer establishment request to the Broadcast-Multicast Service Centre (BM-SC) supporting MBMS within the local EPC. The IOPS MBMS bearer, i.e. the IOPS TMGI, is then identified by the BM-SC with a specific UDP port.

In one embodiment, when the IOPS AF has discovered a user(s), the IOPS AF announces to the discovered user(s) the IOPS MBMS bearer. The IOPS AF indicates to the users that group communication sessions are transmitted over the IOPS MBMS bearer. Thereby, the user(s) starts monitoring the IOPS MBMS bearer to receive data being addressed to its pre-configured group IP multicast address(es) over the corresponding IOPS TMGI.

The IOPS MBMS bearer is established to transmit the IP packets received by the IOPS AF that are related to group communication sessions. In one embodiment, all the IP packets related to group communication sessions are always transmitted from the IOPS AF over the IOPS MBMS bearer on the IOPS mode of operation. For that, the IOPS AF transmits the received IP packets using an outer IP header with the BM-SC IP address and the UDP port associated to the corresponding TMGI. The BM-SC then transmits the IP packets to the corresponding eNB(s) associated to the IOPS TMGI, as described in 3GPP TS 23.468 and 3GPP TS 29.468.

On the other hand, IP packets received by the IOPS AF that are related to a one to one communication session are transmitted via unicast bearers via the local EPC.

In one embodiment, during the IOPS discovery procedure, the MC users do not publish any user group information to the IOPS AF. This mitigates security risks related to storing user group configuration on the IOPS AF during the IOPS mode of operation.

As the IOPS AF does not look into the payload of the received IP packets, in one embodiment, the IOPS AF determines if a received IP packet is related to a group communication session based on the type of IP address of the actual destination IP address. The actual destination IP address is the one contained within the inner IP header of the received IP packet. Therefore, when the IOPS AF identifies that the IP address type of the actual destination IP address is a multicast IP address, the IOPS AF determines that it is an IP packet related to a group communication session. Subsequently, the IOPS AF distributes the received IP packet over the IOPS MBMS bearer, i.e. the IOPS TMGI, to be broadcasted to the users within the IOPS system coverage. For the case of a unicast IP address type, the IOPS AF distributes the received IP packets via unicast transmissions.

Hence, in one embodiment, the IOPS AF is configured to distribute all IP packets with a destination IP multicast address over the already established IOPS MBMS bearer. As all discovered MC users have been already requested to monitor the IOPS MBMS bearer, it is up to the MC users to filter and decode only those IP packets being addressed to the group IP multicast addresses which have been preconfigured within the user configuration profile. Subsequently, the MC users discard all other received IP packets, i.e. those IP packets addressed to non-preconfigured group IP multicast addresses.

In one embodiment, the IOPS AF may decide to dynamically establish additional IOPS MBMS bearers, i.e. additional TMGIs, based on the IP multicast addresses being identified from the received IP packets. For instance, when the IOPS AF identifies for the first time that IP packets are being addressed to an IP multicast address, i.e. addressing a group of users, the IOPS AF dynamically establishes a new TMGI to transmit only all related IP packets targeting the corresponding IP multicast address. Subsequently, the IOPS AF announces to all the discovered users that a new TMGI has been configured for the corresponding IP multicast address. Therefore, only users who have interest in this group, i.e. users who have been preconfigured with the corresponding IP multicast address, start monitoring the corresponding TMGI. Other users then are not required to monitor such a TMGI.

FIG. 3

Figure 3:
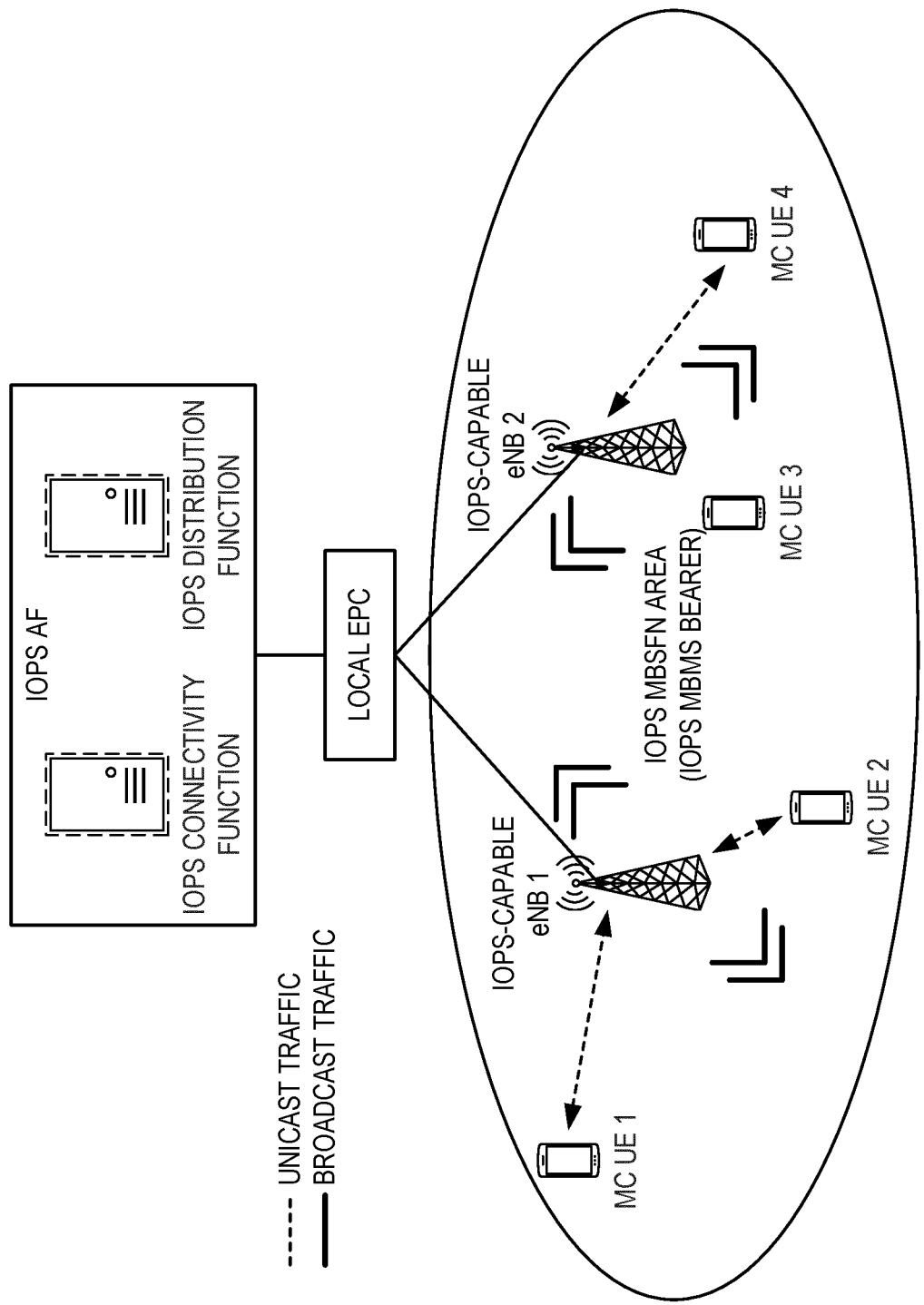
FIG. 3 depicts an IOPS MBMS configuration to support MC service group communications based on always MBMS-based transmissions.

FIG. 3 depicts the described MBMS configuration to support MC service group communications based on always MBMS-based transmissions. In this example, the IOPS EPS includes two IOPS-capable eNBs (denoted eNB1 and eNB 2), a local EPC, and an IOPS AF. Note that the local EPC and the IOPS AF may be implemented at one or more network nodes that are external from but connected to the eNBs (e.g., via direct connection or local network) or, alternatively, may be implemented as part of one of the eNBs. The IOPS AF includes an IOPS connectivity function and an IOPS distribution function. The IOPS system provides connectivity to a number of MC UEs, denoted MC UE 1, MC UE 2, MC UE 3, and MC UE 4. As described above, the IOPS AF pre-establishes the IOPS MBMS bearer within the IOPS MBSFN area. Subsequently, the IOPS AF (in particular the IOPS connectivity function) discovers the MC UEs 1, 2, 3, and 4. As discussed above, the IOPS AF (in particular the IOPS distribution function) transmits the IP packets received by the IOPS AF that are related to group communication sessions over the IOPS MBMS bearer.

Figure 4A:
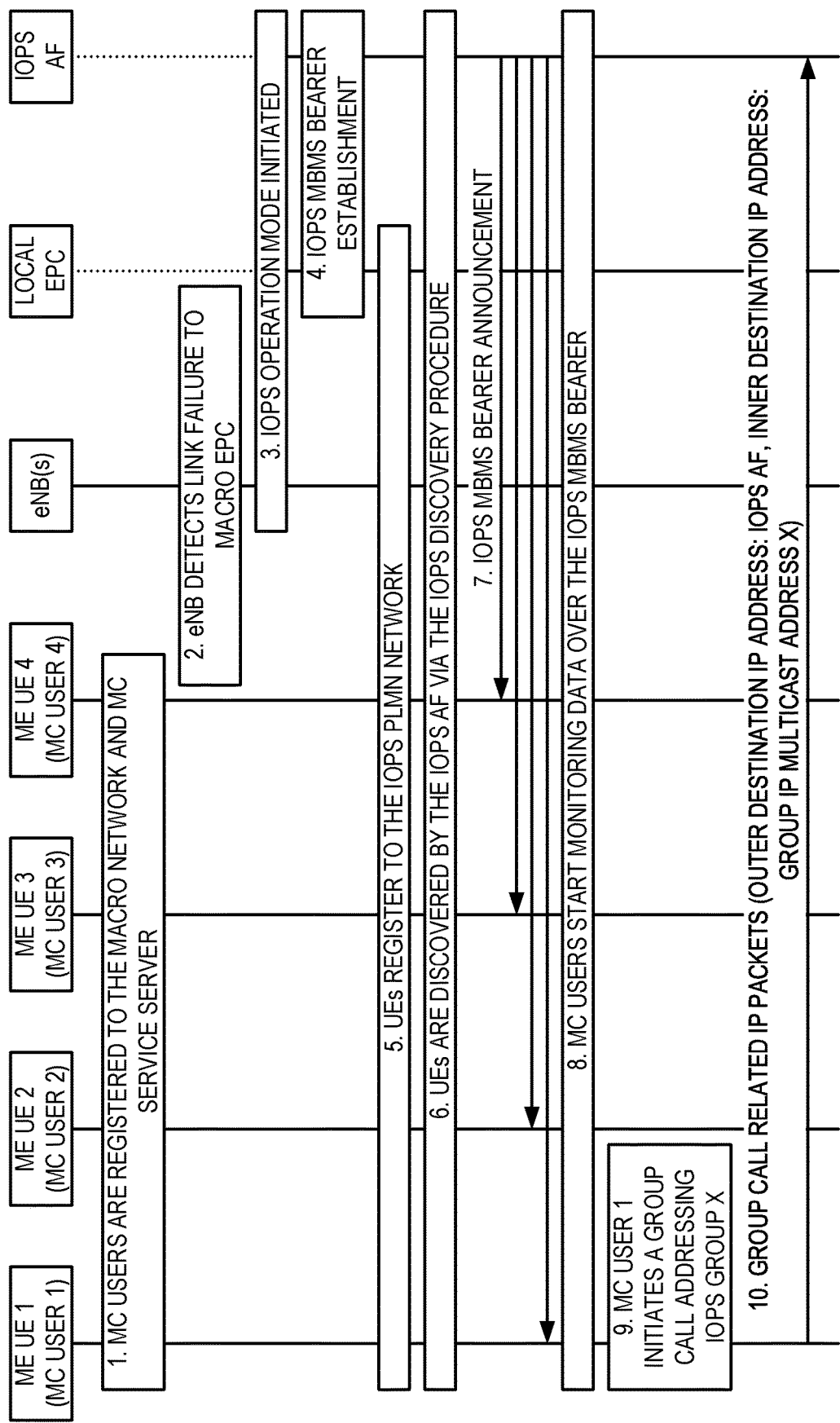
FIGS. 4A and 4B illustrate the operation of the IOPS EPS of FIG. 3 in accordance with some embodiments of the present disclosure.
Figure 4B:
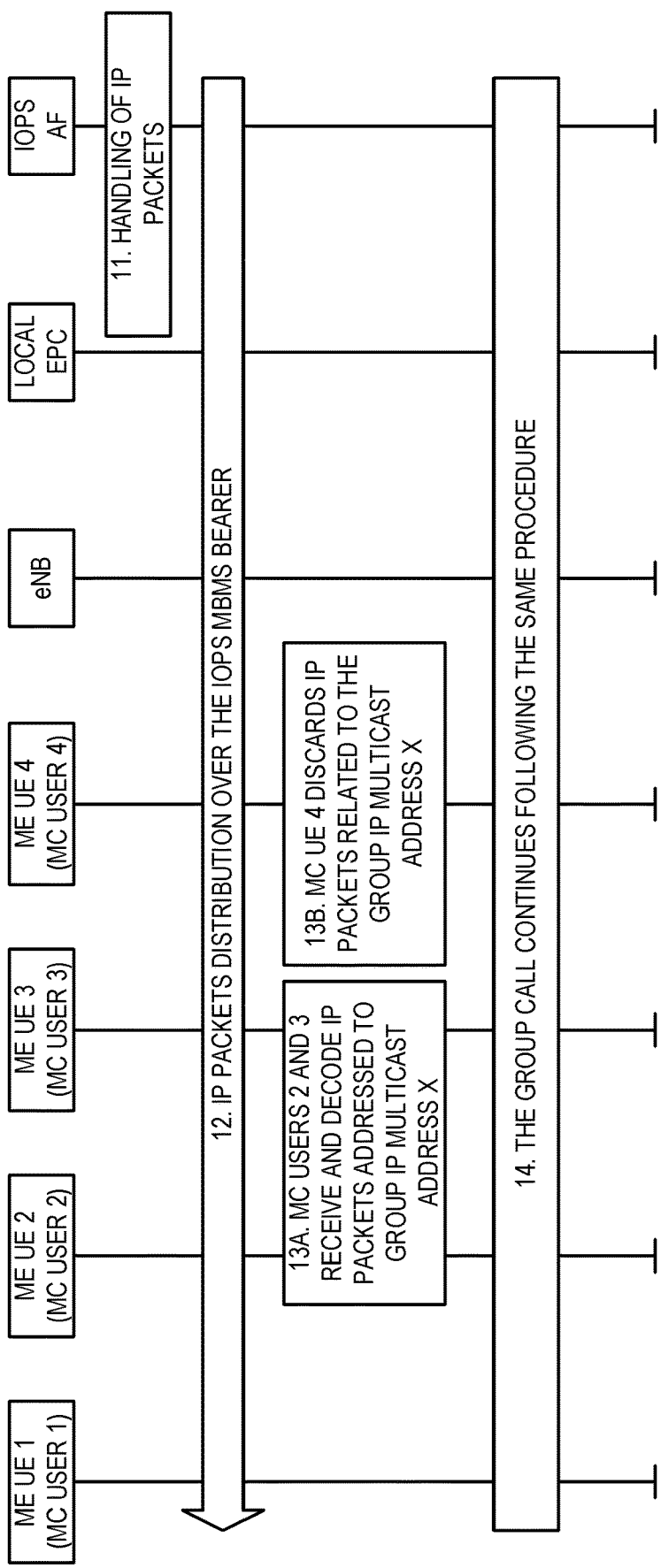

FIGS. 4A and 4B

FIGS. 4A and 4B illustrate the operation of the IOPS EPS of FIG. 3 in accordance with at least some aspects of the embodiments described above. In FIG. 4, the MC UEs 1, 2 and 3 are assumed to belong to the same IOPS group X, i.e. the users have been preconfigured with a group IP multicast address X associated to the IOPS group X. The steps of the procedure illustrated in FIGS. 4A and 4B are as follows:

1. Before the IOPS mode of operation is initiated, it is assumed that the UEs are registered to the macro PLMN network and MC services are supported based on normal on-network operation.
2. The IOPS-cable eNB(s) detects that it lost connectivity to the macro EPC. Hence, all UEs within the coverage area of the eNB(s) are detached from the network.
3. The IOPS mode of operation is initiated, i.e. the eNB(s) is an IOPS-capable eNB(s) and begins broadcasting the IOPS PLMN. The IOPS PLMN network is based on an available local EPC supporting the IOPS mode of operation. The IOPS AF also begins operating together with the local EPC to support MC services on the IOPS mode of operation. The local EPC supports MBMS and the cells served by the eNB(s) are configured to form the IOPS MBSFN area.
4. The IOPS AF sends a request to the local EPC to establish a MBMS bearer, i.e. the IOPS MBMS bearer, within the IOPS MBSFN area. The IOPS MBMS bearer is then established and associated to a TMGI and UDP port.
5. Upon the detection of the IOPS PLMN, the UEs register to the IOPS network.
6. The MC UEs initiate the IOPS discovery procedure and become discovered by the IOPS AF. As part of the discovery procedure the MC UEs are not required to publish any group configuration.
7. Once a MC UE(s) is discovered by the IOPS AF, the IOPS AF announces the IOPS MBMS bearer. The IOPS AF indicates to the MC UE(s) that group communication sessions are transmitted over the IOPS MBMS bearer.
8. The MC UE(s) start monitoring the IOPS MBMS bearer and start sending the MBMS listening status report to the IOPS AF.
9. In this example, MC UE 1 initiates a group call with the preconfigured IOPS group X. For that, the MC UE 1 encapsulates the related IP packets within IP to be transmitted to the targeted group's UEs via the IOPS AF. Therefore, the IP packets contain an inner IP header and an outer IP header. The inner IP header includes, as destination IP address, the associated preconfigured group IP multicast address of the IOPS group X. The outer IP header includes the configured IP address of the IOPS distribution function at the IOPS AF.
10. The group call related IP packets are transmitted to the IOPS AF.
11. In this example, the IOPS AF, in this case the IOPS distribution function, receives the IP packets and determine if the inner IP address type is a multicast IP address or a unicast IP address. For this case, the IOPS AF identifies that the inner destination IP address is a group IP multicast address.
12. The IOPS AF distributes the related IP packets over the IOPS MBMS bearer. For that, in this embodiment, the IP packets are transmitted over the corresponding TMGI/UDP port via the BM-SC, i.e. the IP packets are encapsulated within IP with an inner IP header including the group IP multicast address X and an outer IP header including the IP address of the BM-SC.
13. MC UEs 2 and 3 receive and decode the IP packets addressed to the group IP multicast address X. MC UE 4 discards those related IP packets.
14. The group call continues following the same described procedure.

MC Service Group Communication Support on the IOPS Mode of Operation Based on MBMS-Based Transmissions and/or Unicast Transmissions As an enhanced embodiment, one or more IOPS MBMS bearers are pre-established or dynamically established on the IOPS mode of operation in order to support a more flexible MBMS implementation. Group communication sessions can be based on MBMS-based transmissions as well as unicast transmissions.

For that, the MC UEs publish group configuration (e.g. preconfigured UE's group IP multicast addresses) to the IOPS AF during the IOPS discovery procedure. Thereby, the IOPS AF obtains information about which IOPS groups a discovered UE belongs to, i.e. which group IP multicast address(es) a UE has been preconfigured with. Based on this, the IOPS AF can build a basic temporary user profile of discovered UEs including which IOPS groups the UEs may communicate with on the IOPS mode of operation.

Based on the received group configuration, the IOPS AF may decide to pre-establish or dynamically establish more than one IOPS MBMS bearer. Also, the IOPS AF may decide to distribute the group communication related IP packets based on either MBMS transmissions (over a corresponding IOPS MBMS bearer) or unicast transmissions or both.

In one embodiment, the IOPS AF may decide to pre-establish or dynamically establish one or more IOPS MBMS bearers considering, e.g., required MBMS bearer capacity and number of IOPS groups the IOPS AF has identified. For the later case, the IOPS AF may decide to establish an IOPS TMGI per identified IOPS group or an IOPS TMGI per a sub-set of IOPS groups. In a more efficient way, the IOPS AF may decide to dynamically establish a new IOPS MBMS bearer when the IOPS AF firstly identifies that an IP packet is targeting an IOPS group that hasn't been associated to an already established IOPS MBMS bearer yet.

In an additional embodiment, the IOPS AF can decide to initially pre-establish only an IOPS MBMS bearer, as described above in the section entitled "MC service group communication support on the IOPS mode of operation based on always MBMS-based transmissions", and then decide to dynamically establish one or more IOPS MBMS bearers when required. Subsequently, the IOPS AF efficiently announces to the UEs which IOPS MBMS bearers need to be monitored.

Based on the group configuration the IOPS AF has received and the corresponding MBMS bearer configuration, i.e. the corresponding establishment of IOPS TMGIs, the IOPS AF announces to the UEs which TMGI(s) each UE should monitor to receive group communication related IP packets.

FIG. 5

Figure 5:
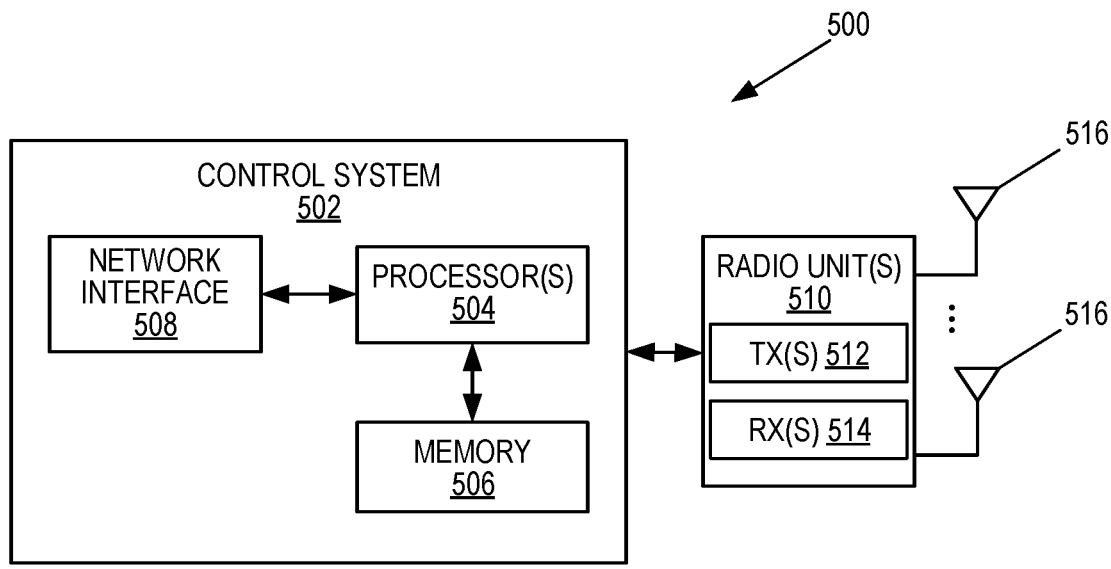
FIG. 5 is a schematic block diagram of a radio access node according to some embodiments of the present disclosure.

FIG. 5 is a schematic block diagram of a radio access node 500 according to some embodiments of the present disclosure. The radio access node 500 may be, for example, a base station 202 or 206. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 includes one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a radio access node 500 as described herein. In some embodiments, the function(s) are implemented in software that is stored, e.g., in the memory 506 and executed by the one or more processors 504.

FIG. 6

Figure 6:
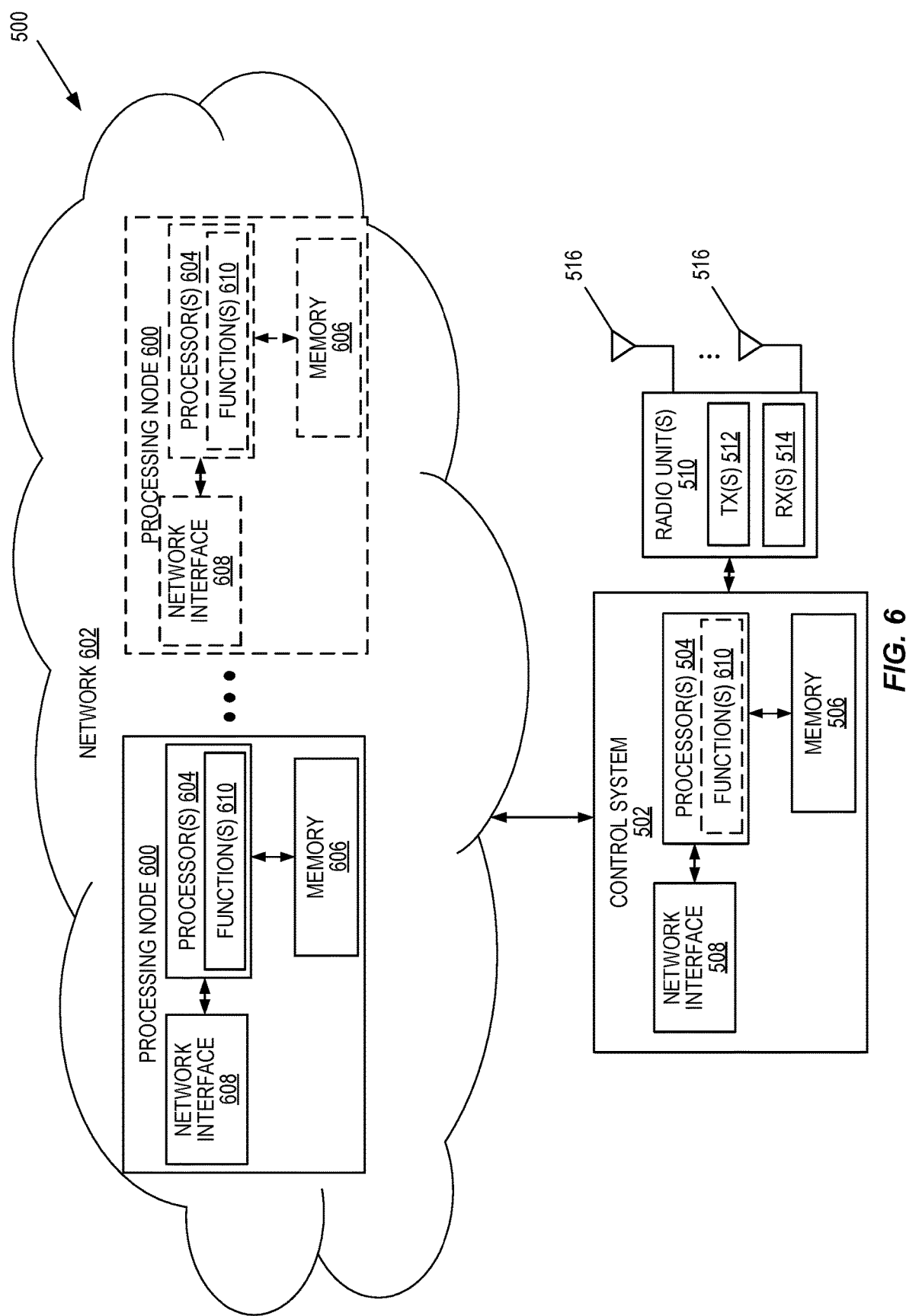
FIG. 6 is a schematic block diagram that illustrates a virtualized embodiment of the radio access node 500 according to some embodiments of the present disclosure.

FIG. 6 is a schematic block diagram that illustrates a virtualized embodiment of the radio access node 500 according to some embodiments of the present disclosure. This discussion is equally applicable to other types of network nodes. Further, other types of network nodes may have similar virtualized architectures.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 includes the control system 502 that includes the one or more processors 504 (e.g., CPUs, ASICs, FPGAs, and/or the like), the memory 506, and the network interface 508 and the one or more radio units 510 that each includes the one or more transmitters 512 and the one or more receivers 514 coupled to the one or more antennas 516, as described above. The control system 502 is connected to the radio unit(s) 510 via, for example, an optical cable or the like. The control system 502 is connected to one or more processing nodes 600 coupled to or included as part of a network(s) 602 via the network interface 508. Each processing node 600 includes one or more processors 604 (e.g., CPUs, ASICs, FPGAs, and/or the like), memory 606, and a network interface 608.

In this example, functions 610 of the radio access node 500 described herein are implemented at the one or more processing nodes 600 or distributed across the control system 502 and the one or more processing nodes 600 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 7

Figure 7:
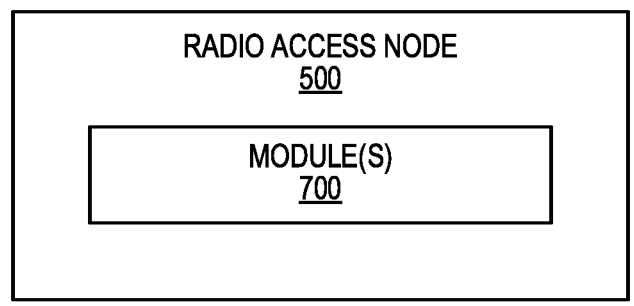
FIG. 7 is a schematic block diagram of the radio access node 500 according to some other embodiments of the present disclosure.

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

FIG. 8

Figure 8:
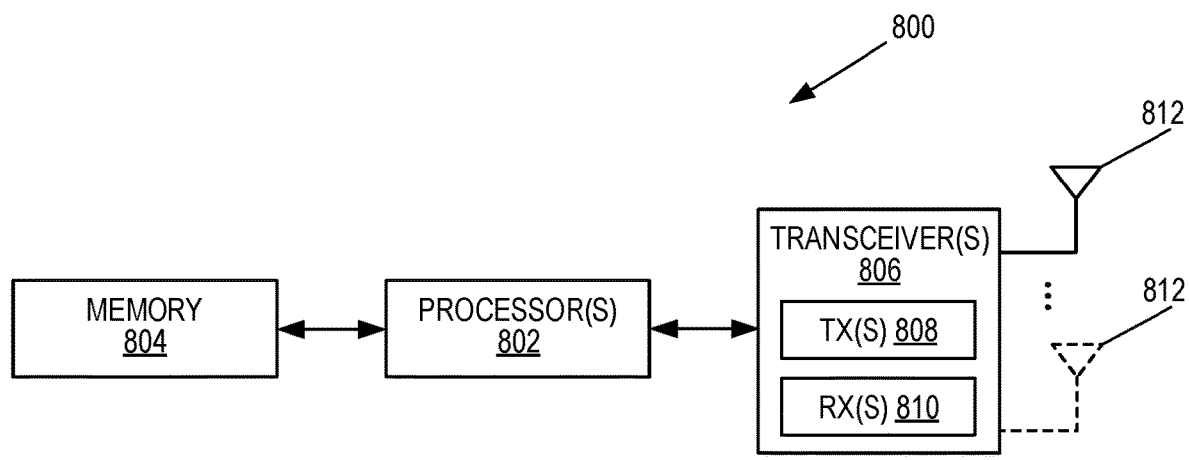
FIG. 8 is a schematic block diagram of a UE 800 according to some embodiments of the present disclosure.

FIG. 8 is a schematic block diagram of a UE 800 according to some embodiments of the present disclosure. As illustrated, the UE 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the UE 800 described above may be fully or partially implemented in software that is, e.g., stored in the memory 804 and executed by the processor(s) 802. Note that the UE 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the UE 800 and/or allowing output of information from the UE 800), a power supply (e.g., a battery and associated power circuitry), etc.

In some embodiments, a computer program including instructions which, when executed by at least one processor, causes the at least one processor to carry out the functionality of the UE 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 9

Figure 9:
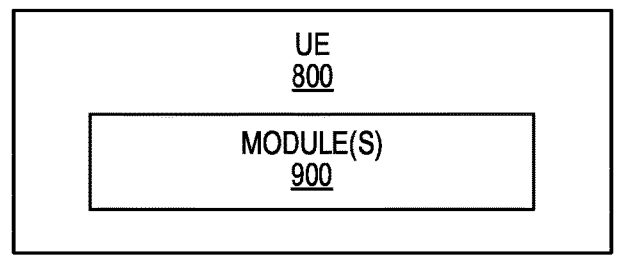
FIG. 9 is a schematic block diagram of the UE 800 according to some other embodiments of the present disclosure.

FIG. 9 is a schematic block diagram of the UE 800 according to some other embodiments of the present disclosure. The UE 800 includes one or more modules 900, each of which is implemented in software. The module(s) 900 provide the functionality of the UE 800 described herein.

Some Embodiments

Some embodiments that are described above may be summarized in the following manner:

1. A method performed by an IOPS application function, AF, to provide a group communication service, the method comprising:
   establishing (FIG. 4A, step 4) an IOPS MBMS bearer, the IOPS MBMS bearer being an MBMS bearer within a MBSFN area served by one or more radio access nodes that are operating in an IOPS mode of operation;
   discovering (FIG. 4A, step 6) one or more User Equipments, UEs, via an IOPS discovery procedure;
   sending (FIG. 4A, step 7), to the one or more UEs, an MBMS bearer announcement for the IOPS MBMS bearer.
2. The method of embodiment 1 further comprising:
   receiving (FIG. 4A, step 10) an IP packet from a UE via one of the one or more radio access nodes that are operating in the IOPS mode of operation;
   determining (FIG. 4B, step 11) that the IP packet is for a group communication service;
   upon determining (FIG. 4B, step 11) that the IP packet is for the group communication service, sending (FIG. 4B, step 12) the IP packet over the IOPS MBMS bearer.
3. The method of embodiment 2 wherein all IP packets related to group communication sessions are sent over the IOPS MBMS bearer.
4. The method of embodiment 3 wherein sending (FIG. 4B, step 12) the IP packet over the IOPS MBMS bearer comprises sending (FIG. 4B, step 12) the IP packet over the IOPS MBMS bearer using an outer IP header with a BM-SC IP address and UDP port associated to a corresponding TMGI.
5. The method of any one of embodiments 2 to 4 wherein determining (FIG. 4B, step 11) that the IP packet is for the group communication service comprises:
   determining that an IP address of an actual IP address of the IP packet is a multi-cast IP address.
6. The method of embodiment 5 wherein the actual IP address of the IP packet is an IP address contained within an inner IP header of the IP packet, wherein the IP packet comprises:
   the inner IP header comprising the actual IP address of the IP packet; and
   an outer IP header comprising an IP address associated with the IOPS MBMS bearer (e.g., a BM-SC IP address and UDP port associated to a corresponding TMGI).
7. The method of any one of embodiments 1 to 6 wherein establishing (FIG. 4A, step 4) the IOPS MBMS bearer comprises pre-establishing (FIG. 4A, step 4) the IOPS MBMS bearer upon initiation of the IOPS mode of operation.
8. The method of any one of embodiments 1 to 7 wherein the MBMS bearer announcement indicates that one or more group communication sessions for the group communication service are transmitted over the IOPS MBMS bearer.
9. The method of any one of embodiments 1 to 8 wherein the one or more UEs do not publish any user group information to the IOPS AF during the IOPS discovery procedure.
10. The method of embodiment 7 further comprising pre-establishing one or more additional IOPS MBMS bearers.
11. The method of embodiment 10 wherein the IOPS MBMS bearer and the one or more additional IOPS MBMS bearers are pre-established based on group configuration information obtained from the one or more UEs during the IOPS discovery procedure.
12. The method of embodiment 10 wherein the IOPS MBMS bearer and the one or more additional IOPS MBMS bearers are pre-established based on group configuration information obtained from the one or more UEs during the IOPS discovery procedure and one or more additional criteria (e.g., required MBMS bearer capacity, number of IOPS groups, or both).
13. The method of any one of embodiments 1 to 9 further comprising dynamically establishing one or more additional IOPS MBMS bearers.
14. The method of any one of embodiments 1 to 9 further comprising:
    receiving additional IP packets with different multicast IP addresses; and
    dynamically establishing one or more additional IOPS MBMS bearers based on the different multicast IP addresses.
15. The method of any one of embodiments 10 to 11 further, to the one or more UEs, one or more additional MBMS bearer announcements for the one or more additional IOPS MBMS bearers.
16. A network node that implements an IOPS application function, AF, for providing a group communication service, the network node adapted to perform the method of any one of embodiments 1 to 15.
17. A method performed by User Equipment, UE, for group communication in an IOPS system, the method comprising:
    performing (FIG. 4A, step 6) an IOPS discovery procedure by which an IOPS AF discovers the UE;
    receiving (FIG. 4A, step 7), from the IOPS AF, an MBMS bearer announcement for an IOPS MBMS bearer, the IOPS MBMS bearer being an MBMS bearer within a MBSFN area served by one or more radio access nodes that are operating in an IOPS mode of operation.
18. The method of embodiment 17 further comprising receiving (FIG. 4B, step 12, 13A, 13B) an IP packet for a group communication session from the IOPS AF over the IOPS MBMS bearer.

19. The method embodiment 18 wherein all IP packets related to group communication sessions are sent over the IOPS MBMS bearer.

20. The method of embodiment 18 or 19 further comprising:
   determining that the IP packet is addressed to a particular multicast address for a particular group communication session being monitored by the UE; and
   upon determining that the IP packet is addressed to the particular multicast address for the particular group communication session being monitored by the UE, decoding (FIG. 4B, step 13A) the IP packet.

21. The method of embodiment 18 or 19 further comprising:
   determining that the IP packet is addressed to a particular multicast address for a particular group communication session that is not being monitored by the UE; and
   upon determining that the IP packet is addressed to the particular multicast address for the particular group communication session that is not being monitored by the UE, discarding (FIG. 4B, step 13B) the IP packet.

22. The method of any one of embodiments 17 to 21 wherein the MBMS bearer announcement indicates that one or more group communication sessions for the group communication service are transmitted over the Iops MBMS bearer.

23. The method of any one of embodiments 17 to 22 wherein the UE does not publish any user group information to the IOPS AF during the IOPS discovery procedure.

24. The method of any one of embodiments 17 to 22 wherein the UE does publish user group information to the IOPS AF during the IOPS discovery procedure.

25. A User Equipment, UE, adapted to perform the method of any one of embodiments 17 to 24.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Abbreviations

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AF Application Function
AMF Access and Mobility Management Function
AN Access Network
AP Access Point
AUSF Authentication Server Function
BS Base Station
BSC Base Station Controller
BTS Base Transceiver Station
CDMA Code Division Multiple Access
CGI Cell Global Identifier
DL Downlink
DN Data Network
ECGI Evolved Cell Global Identifier
eNB Enhanced or Evolved Node B
EPC Evolved Packet Core
EPS Evolved Packet System
E-UTRA Evolved Universal Terrestrial Radio Access
E-UTRAN Evolved Universal Terrestrial Radio Access Network
GC Group Communication
GERAN Global System for Mobile (GSM) Communications Enhanced Data Rates for GSM Evolution Radio Access Network
gNB New Radio Base Station
GSM Global System for Mobile Communications
HO Handover
HSPA High Speed Packet Access
IOPS Isolated Evolved Universal Terrestrial Radio Access Network Operations for Public Safety
IP Internet Protocol
LAN Local Area Network
LTE Long Term Evolution
MAC Medium Access Control
MBMS Multimedia Broadcast Multicast Services
MBSFN Multimedia Broadcast Multicast Service Single Frequency Network
MC Mission Critical
MIB Master Information Block
MME Mobility Management Entity
MSC Mobile Switching Center
NEF Network Exposure Function
NF Network Function
NFV Network Function Virtualization
NR New Radio
NRF Network Function Repository Function
NSSF Network Slice Selection Function
O&M Operation and Maintenance
OSS Operations Support System
PCF Policy Control Function
P-GW Packet Data Network Gateway
PLMN Public Land Mobile Network
PRB Physical Resource Block
PSTN Public Switched Telephone Networks
PTT Push to Talk
QoS Quality of Service
RAN Radio Access Network
RAT Radio Access Technology
SCEF Service Capability Exposure Function
SDU Service Data Unit S-GW Serving Gateway
SI System Information
SIB System Information Block
SIM Subscriber Identity Module
SMF Session Management Function
TCP Transmission Control Protocol
TMGI Temporary Mobile Group Identity
UDM Unified Data Management
UE User Equipment
UL Uplink
UMTS Universal Mobile Telecommunications System
USIM Universal Subscriber Identity Module
UTRA Universal Terrestrial Radio Access
UTRAN Universal Terrestrial Radio Access Network
VNE Virtual Network Element
VNF Virtual Network Function
VoIP Voice over Internet Protocol
WCDMA Wideband Code Division Multiple Access
WD Wireless Device

The invention claimed is:

1. A method performed by an Isolated Evolved Universal Terrestrial Radio Access Network Operations for Public Safety, IOPS, application function, AF, to provide a group communication service, the method comprising:
   establishing an IOPS Multicast-Broadcast Multimedia Services, MBMS, bearer, the IOPS MBMS bearer being an MBMS bearer within a Multicast-Broadcast Single-Frequency Network, MBSFN, area served by one or more radio access nodes that are operating in an IOPS mode of operation;
   discovering one or more User Equipments, UEs, via an IOPS discovery procedure; and
   sending, to the one or more UEs, an MBMS bearer announcement for the IOPS MBMS bearer.

2. The method of claim 1 further comprising:
   receiving an Internet Protocol, IP, packet from a UE via one of the one or more radio access nodes that are operating in the IOPS mode of operation;
   determining that the IP packet is for a group communication service; and
   upon determining that the IP packet is for the group communication service, sending the IP packet over the IOPS MBMS bearer.

3. The method of claim 2 wherein all IP packets related to group communication sessions are sent over the IOPS MBMS bearer.

4. The method of claim 3 wherein sending the IP packet over the IOPS MBMS bearer comprises sending the IP packet over the IOPS MBMS bearer using an outer IP header with a Broadcast-Multicast Service Centre, BM-SC, IP address and User Datagram Protocol, UDP, port associated to a corresponding Temporary Mobile Group Identity, TMGI.

5. The method of claim 2 wherein determining that the IP packet is for the group communication service comprises:
   determining that an IP address of an actual IP address of the IP packet is a multi-cast IP address.

6. The method of claim 5 wherein the actual IP address of the IP packet is an IP address contained within an inner IP header of the IP packet, wherein the IP packet comprises:
   the inner IP header comprising the actual IP address of the IP packet; and
   an outer IP header comprising an IP address associated with the IOPS MBMS bearer.

7. The method of claim 1 wherein establishing the IOPS MBMS bearer comprises pre-establishing the IOPS MBMS bearer upon initiation of the IOPS mode of operation.

8. The method of claim 1 wherein the MBMS bearer announcement indicates that one or more group communication sessions for the group communication service are transmitted over the IOPS MBMS bearer.

9. The method of claim 7 further comprising pre-establishing one or more additional IOPS MBMS bearers.

10. The method of claim 9 wherein the IOPS MBMS bearer and the one or more additional IOPS MBMS bearers are pre-established based on group configuration information obtained from the one or more UEs during the IOPS discovery procedure.

11. The method of claim 9 wherein the IOPS MBMS bearer and the one or more additional IOPS MBMS bearers are pre-established based on group configuration information obtained from the one or more UEs during the IOPS discovery procedure and one or more additional criteria.

12. A network node that implements an Isolated Evolved Universal Terrestrial Radio Access Network Operations for Public Safety, IOPS, application function, AF, for providing a group communication service, the network node adapted to:
   establishing an IOPS Multicast-Broadcast Multimedia Services, MBMS, bearer, the IOPS MBMS bearer being an MBMS bearer within a Multicast-Broadcast Single-Frequency Network, MBSFN, area served by one or more radio access nodes that are operating in an IOPS mode of operation;
   discovering one or more User Equipments, UEs, via an IOPS discovery procedure; and
   sending, to the one or more UEs, an MBMS bearer announcement for the IOPS MBMS bearer.

13. A method performed by User Equipment, UE, for group communication in an Isolated Evolved Universal Terrestrial Radio Access Network Operations for Public Safety, IOPS, system, the method comprising:
   performing an IOPS discovery procedure by which an IOPS application function, AF, discovers the UE; and
   receiving, from the IOPS AF, an Multicast-Broadcast Multimedia Services, MBMS, bearer announcement for an IOPS MBMS bearer, the IOPS MBMS bearer being an MBMS bearer within a Multicast-Broadcast Single-Frequency Network, MBSFN, area served by one or more radio access nodes that are operating in an IOPS mode of operation.

14. The method of claim 13 further comprising receiving an Internet Protocol, IP, packet for a group communication session from the IOPS AF over the IOPS MBMS bearer.

15. The method of claim 14 wherein all Internet Protocol, IP, packets related to group communication sessions are sent over the IOPS MBMS bearer.

16. The method of claim 14 further comprising:
   determining that the IP packet is addressed to a particular multicast address for a particular group communication session being monitored by the UE; and
   upon determining that the IP packet is addressed to the particular multicast address for the particular group communication session being monitored by the UE, decoding the IP packet.

17. The method of claim 14 further comprising:
   determining that the IP packet is addressed to a particular multicast address for a particular group communication session that is not being monitored by the UE; and
   upon determining that the IP packet is addressed to the particular multicast address for the particular group communication session that is not being monitored by the UE, discarding the IP packet.

18. The method of claim 13 wherein the MBMS bearer announcement indicates that one or more group communication sessions for the group communication service are transmitted over the IOPS MBMS bearer.

19. The method of claim 13 wherein the UE does publish user group information to the IOPS AF during the IOPS discovery procedure.

20. A User Equipment, UE, adapted to:
- performing an Isolated Evolved Universal Terrestrial Radio Access Network Operations for Public Safety, IOPS, discovery procedure by which an IOPS application function, AF, discovers the UE; and
- receiving, from the IOPS AF, an Multicast-Broadcast Multimedia Services, MBMS, bearer announcement for an IOPS MBMS bearer, the IOPS MBMS bearer being an MBMS bearer within a Multicast-Broadcast Single-Frequency Network, MBSFN, area served by one or more radio access nodes that are operating in an IOPS mode of operation.

* * * * *